(12) United States Patent
Nakada et al.

(10) Patent No.: US 8,209,990 B2
(45) Date of Patent: Jul. 3, 2012

(54) ELECTROSTATICALLY ATOMIZING UNIT FOR USE IN A TEMPERATURE-REGULATING APPLIANCE

(75) Inventors: Takayuki Nakada, Hikone (JP); Hiroshi Suda, Takatsuki (JP); Masaharu Machi, Shijonawate (JP); Tomohiro Yamaguchi, Moriyama (JP)

(73) Assignee: Panasonic Corporation, Osaka (JP)

( * ) Notice: Subject to any disclaimer, the term of this patent is extended or adjusted under 35 U.S.C. 154(b) by 435 days.

(21) Appl. No.: 12/518,880

(22) PCT Filed: Dec. 11, 2007

(86) PCT No.: PCT/JP2007/074192
§ 371 (c)(1),
(2), (4) Date: Jun. 11, 2009

(87) PCT Pub. No.: WO2008/072759
PCT Pub. Date: Jun. 19, 2008

(65) Prior Publication Data
US 2010/0000240 A1    Jan. 7, 2010

(30) Foreign Application Priority Data
Dec. 15, 2006   (JP) .................. 2006-338879

(51) Int. Cl.
*B05B 5/00*   (2006.01)
(52) U.S. Cl. .................. 62/91; 62/93; 239/690
(58) Field of Classification Search .......... 134/94.1, 134/105; 239/690, 704; 68/20; 62/91, 93
See application file for complete search history.

(56) References Cited

U.S. PATENT DOCUMENTS

| | | | | |
|---|---|---|---|---|
| 2,248,713 | A | * | 7/1941 | Locke .................. 422/121 |
| 7,567,420 | B2 | * | 7/2009 | Kobayashi et al. .......... 361/228 |
| 2008/0130189 | A1 | | 6/2008 | Kobayashi et al. |
| 2009/0001200 | A1 | | 1/2009 | Imahori et al. |

FOREIGN PATENT DOCUMENTS

| | | | |
|---|---|---|---|
| DE | 25 33 690 | * | 2/1976 |
| JP | 02-055295 | * | 2/1990 |

(Continued)

OTHER PUBLICATIONS

International Search Report for the Application No. PCT/JP2007/074192 mailed Apr. 11, 2008.

(Continued)

*Primary Examiner* — Frankie L Stinson
(74) *Attorney, Agent, or Firm* — Cheng Law Group, PLLC

(57) ABSTRACT

An electrostatically atomizing unit for use in a temperature regulating appliance to add a function of generating a mist of charged minute water particles for deodorization and/or sterilization of a temperature-regulated space. The appliance has a cold space of which air is cooled by cooling means and is fed to cool the temperature-regulated space divided from the cold space by a partition. The atomizing unit has an emitter electrode which is configured to condense water from within a surrounding air. A high voltage source applies a high voltage to the emitter electrode to atomize the condensed water into the charged minute water particles which are discharged from the emitter electrode into the temperature-regulated space. The emitter electrode is provided with a cooling coupler which establishes a heat transfer relation through the partition to the cold space to cool the emitter electrode by making the use of the cooling means inherent to the appliance.

11 Claims, 6 Drawing Sheets

FOREIGN PATENT DOCUMENTS

| | | | |
|---|---|---|---|
| JP | 2003-121058 | * | 4/2003 |
| JP | 2005-131549 | * | 5/2005 |
| JP | 2005-296753 A | | 10/2005 |
| JP | 2006-57992 A | | 3/2006 |
| JP | 2006-57999 A | | 3/2006 |
| JP | 2006-068711 | * | 3/2006 |
| JP | 2006-68711 A | | 3/2006 |
| JP | 2006-242556 A | | 9/2006 |
| JP | 2007-137282 A | | 6/2007 |
| WO | WO-2006/009189 A1 | | 1/2006 |
| WO | WO-2006/009190 A1 | | 1/2006 |

OTHER PUBLICATIONS

Notification of Reasons for Refusal for the Application No. 2006-338879 from Japan Patent Office mailed Dec. 22, 2009.

* cited by examiner

ELECTROSTATICALLY ATOMIZING UNIT FOR USE IN A TEMPERATURE-REGULATING APPLIANCE

TECHNICAL FIELD

The present invention is directed to an electrostatically atomizing unit for use in a temperature-regulating appliance, such as a refrigerator, an air conditioner, or the like appliance, to add a function of generating a mist of charged minute water particles.

BACKGROUND ART

Japanese patent publication no. 2006-68711 discloses an electrostatically atomizing unit capable of generating a mist of charged minute water particles. The unit is specifically configured to condense water from within an atmosphere and atomize the condensed water into the mist of the charged minute water particles. For this purpose, the atomizing unit includes a cooling means of cooling an emitter electrode so as to condense the water on it, which eliminates a need of providing a tank holding the water and a mechanism of feeding the water from the tank to the emitter electrode. In this regard, the prior atomizing unit can be successfully incorporated in an appliance or vehicle to add the function of generating the mist with an accompanied effect of deodorization and/or sterilization. However, since the unit necessitates cooling module such as realized by a Peltier-effect module to condense the water and supply the water to the emitter electrode, the cooling module itself adds an extra bulk to the appliance when the unit is incorporated in the appliance, especially when the unit is incorporated in the appliance such as a refrigerator or air conditioner inherently equipped with cooling means which could be utilized to cool the emitter electrode.

DISCLOSURE OF THE INVENTION

In view of the above problem, the present invention has been accomplished to provide an electrostatically atomizing unit which can be incorporated into a temperature-regulating appliance to add a function of generating a mist of charged minute water particles, yet at a minimum space and cost requirement. The appliance includes a housing configured to have a temperature-regulated space and a cold space divided by a partition, and includes cooling means for cooling the cold space relative to the temperature-regulated space to provide a temperature difference therebetween so as to regulate a temperature of the temperature-regulated space by a cold air from the cold space. The atomizing unit includes an emitter electrode which is configured to condense water thereon from within surrounding air when being cooled. The unit includes a high voltage source which is configured to apply a high voltage to the water on the emitter electrode for electrostatically charging the water and atomizing it into the mist of the charged minute water particles at a front end of the emitter electrode. The emitter electrode is configured to have its front end exposed to the temperature-regulated space and to have its opposite rear end held in heat transfer relation with the cold space through the partition so as to be cooled by the cold space for condensing the water on the emitter electrode. With this arrangement, the atomizing unit can utilize the cold air in the cold space for condensing the water on the emitter electrode, and can dispense with a dedicated cooling system, which enables to add the function of generating the mist to the appliance, yet with a minimum structural and space requirement.

Preferably, the atomizing unit include a casing which is configured to accommodate the emitter electrode and the high voltage source. The casing has a front wall and a rear wall spaced from each other, and is mounted on the partition with the rear wall in contact with the partition. The front wall is formed with an outlet for introducing the air from the temperature-regulated space as well as discharging the mist into the temperature-regulated space. The emitter electrode is provided with cooling coupler which projects out through the rear wall into the partition. The cooling coupler can provide a thermal bridge from the cold space to the emitter electrode for effectively cooling the emitter electrode sufficient to condense the water thereon. Thus, the atomizing unit can be easily incorporated in the appliance simply by being mounted on the partition, yet making the best use of the cold air in the appliance for cooling the emitter electrode.

The partition may be partly formed with a reduce-thickness portion which receives the projecting end of the cooling coupler. In this instance, the cooling coupler can have its projecting end close to the cold space for effectively cooling the emitter electrode. The reduced-thickness portion can be realized by a recess formed in the surface of the partition so that the recess can be well utilized to position the atomizing unit on the partition for easy mounting.

Most preferably, the atomizing unit includes an opposed electrode held in an opposite relation with the front end of the emitter electrode, and is connected to receive the high voltage with the emitter electrode being connected to a potential nearer to a ground potential than the opposed electrode. Thus, the partition or the housing of the temperature-regulating appliance can be free from the high voltage to avoid high voltage hazard.

Further, the atomizing unit may additional include a heating jacket which is held in heat transfer relation with the emitter electrode and is configured to heat the emitter electrode. In this connection, the atomizing unit includes a controller which is configured to detect a temperature difference between the cold space and the temperature regulated space and to activate the heating jacket only when the temperature difference exceeds a critical level. Thus, the emitter electrode is protected from being over-cooled, and therefore free from freezing of the water on the emitter electrode, enabling to keep generating the mist.

Alternatively, the emitter electrode may be configured to project its rear end out through the ear wall into the partition to establish a heat transfer relation with the cold space through the partition for effectively cooling the emitter electrode to condense the water thereon. In this instance, the emitter electrode is preferred to be surrounded by a cooling jacket which has a larger volume than the emitter electrode to serve as a thermal accumulator in order to keep cooling the emitter electrode at a desired temperature for successively and stably condensing the water.

These and still other advantageous features of the present invention will become more apparent from the following description of a preferred embodiment when taken in conjunction with the attached drawings.

BRIEF DESCRIPTION OF THE DRAWINGS

FIG. 1 is a schematic sectional view of a refrigerator, a typical one of a temperature regulating appliance which incorporates an electrostatically atomizing unit of the present invention;

BEST MODE FOR CARRYING OUT THE INVENTION

Figure 1:
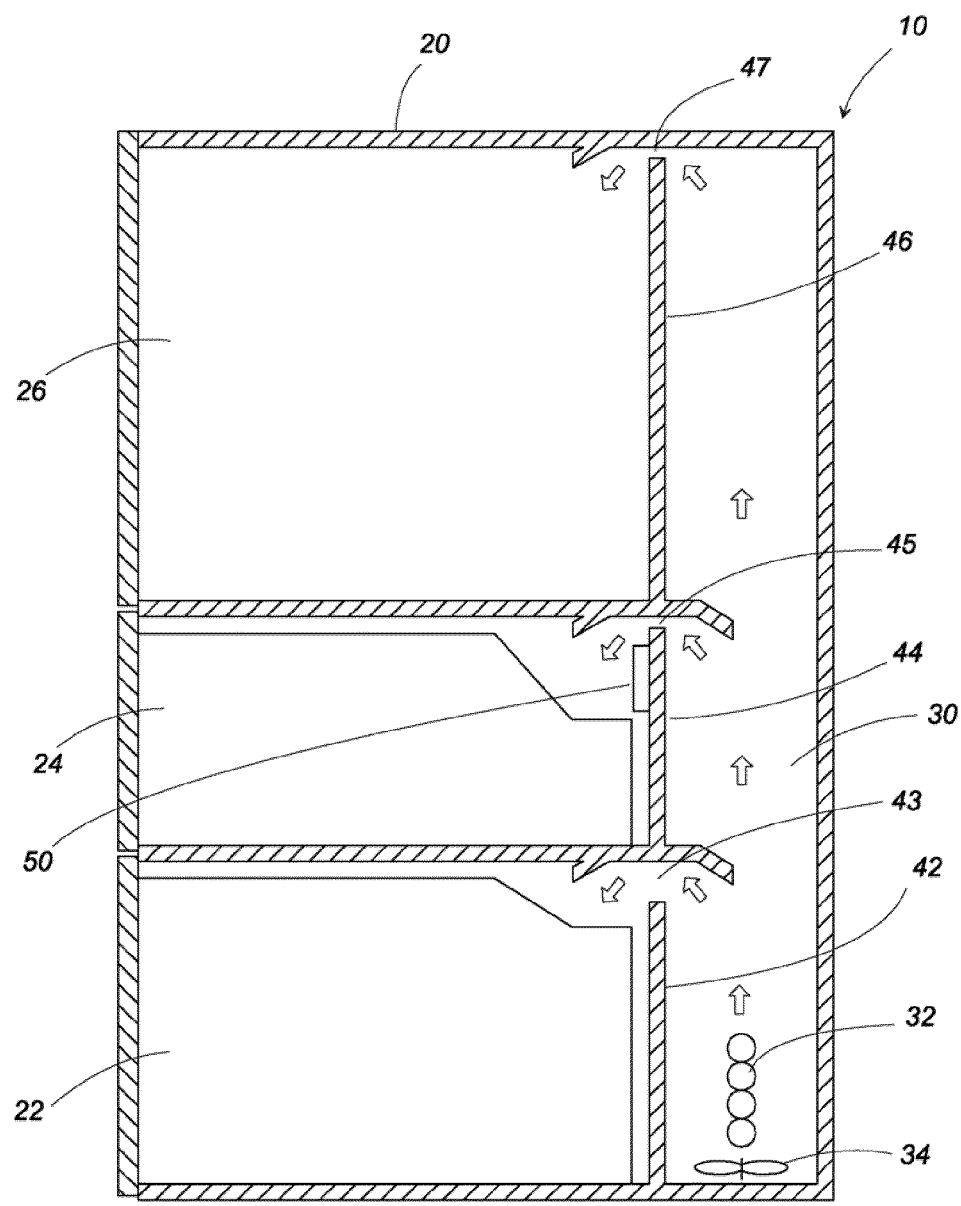
Figure 2:
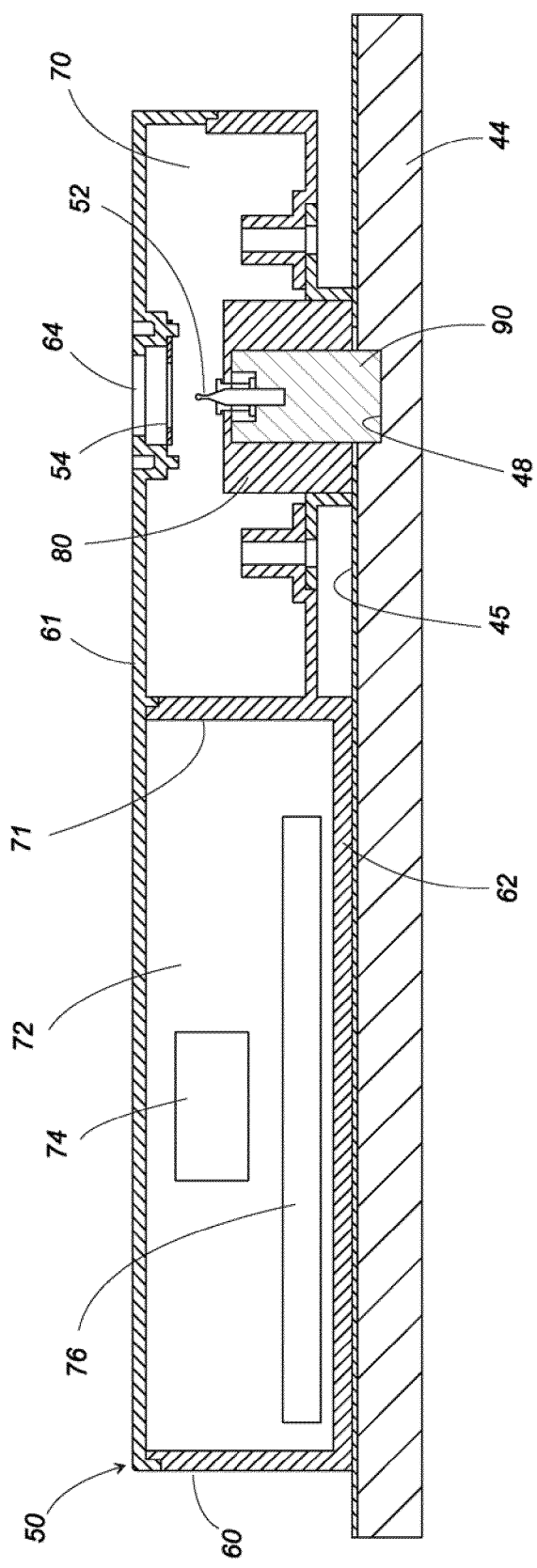
FIG. 2 is a sectional view of the electrostatically atomizing unit utilized in the above temperature regulating appliance.
Figure 3:
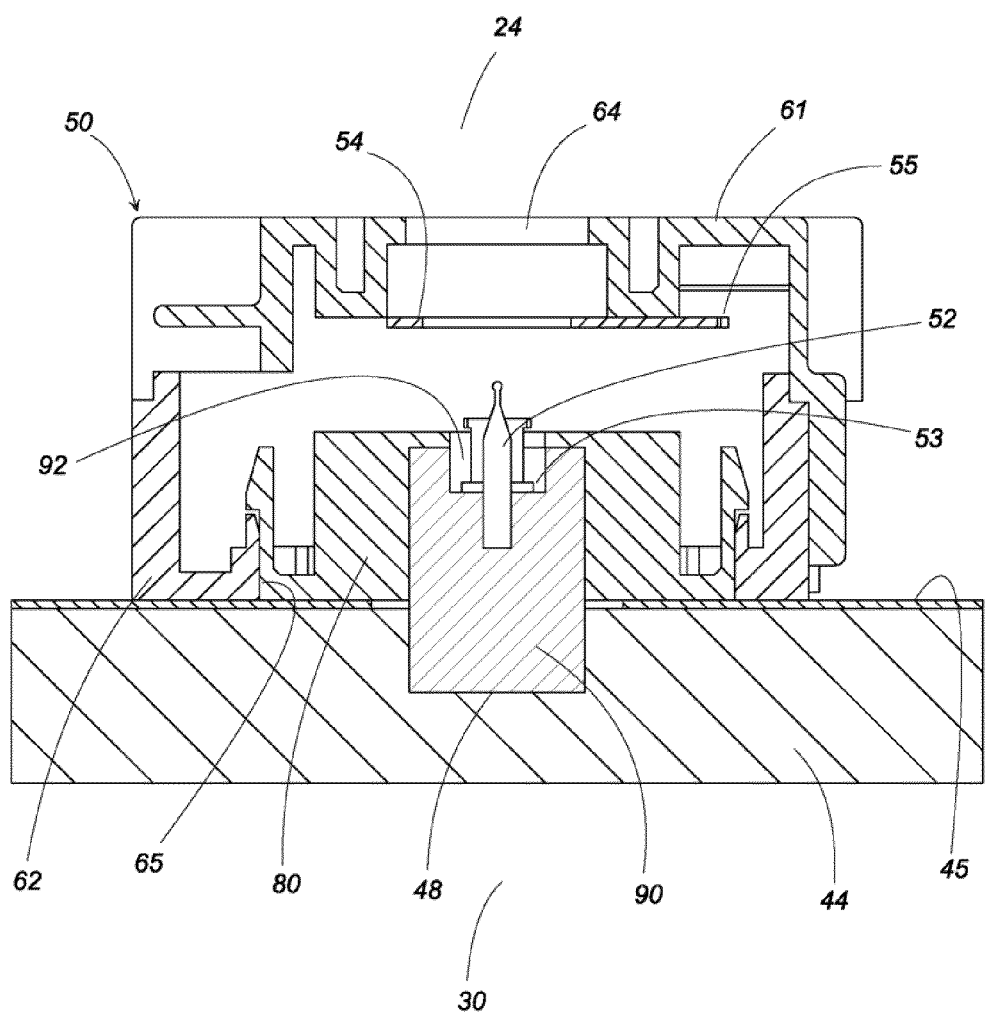
FIG. 3 is a sectional view illustrating a portion of the atomizing unit.

Referring now to FIGS. 1 to 3, there is shown a temperature regulating appliance incorporating an electrostatically atomizing unit 50 of generating a mist of charged minute water particles in accordance with a preferred embodiment of the present invention. In the illustrated embodiment, a refrigerator 10 is shown as a typical example of the appliance inherently equipped with the cooling means of generating a cold air. The present invention is not limited to the use for this particular example, and may be utilized for an air conditioner or the like equipped with the cooling means, and an associated structure with a cold space cooled by the cooling means and at least one temperature regulated space in heat transfer relation with the cold space.

As shown in FIG. 1, the refrigerator 10 includes a housing 20 divided into the cold space 30 and a plurality of temperature-regulated spaces, namely, freezer room 22, a vegetable storage room 24, and a fresh room 26. These rooms are separated respectively by partitions 42, 44, and 46 from the cold space 30 which is supplied with the cold air generated at a cooling device 32 and is blown by a fan 34. For example, the cold air generated and flowing in the cold space 30 is maintained at a temperature of −20° C. The cold air is fed into the individual rooms respectively through restricted openings 43, 45, and 47 for cooling the rooms, for example, the vegetable room 24 to a temperature of +5° C., the freezer room 22 and the fresh room 26 to temperatures of −15° C. and +7° C., respectively. In this sense, each of the rooms can be referred to as a temperature regulated space. The atomizing unit 50 is mounted on the partition 44 separating the vegetable room 24 from the cold space 30 to discharge the mist into the vegetable room 24 for deodorizing and/or sterilizing the vegetable room 24 and contents stored therein.

As shown in FIG. 2, the atomizing unit 50 includes a flat rectangular casing 60 with a front wall 61 and a rear wall 62 spaced from each other to define therebetween a mist chamber 70 and a driver chamber 72 which is hermetically closed chamber separated from the mist chamber 70 by a dividing wall 71. The bottom wall 62 has an opening 65 for detachably receiving a frame 80 which carries an emitter electrode 52 projecting into the mist chamber 70 towards an outlet 64 formed in the front wall 61. An opposed electrode 54 of ring-shape is supported to the front wall 61 around the outlet 64 in an opposed relation to the front end of the emitter electrode 52. The casing 60 and the frame 80 are made of a dielectric plastic material, while the emitter electrode 52, and the opposed electrode 54 are made of an electrically conductive metallic material. As best shown in FIG. 3, the emitter electrode 52 has its rear end connected to and surrounded by a cooling coupler 90 which is made of a metal having a good thermal conductivity into a cylindrical shape fitted within the center of the frame 80. The cooling coupler 90 is formed in its front end with a cavity 92 through with the emitter electrode 52 projects with its rear end embedded into the cooling coupler 90 and with a middle portion being spaced from a side wall of the cavity 92. The cooling coupler 90 has its rear end projecting out through the rear wall 62 of the casing 60 to establish a thermal bridge between the cold space 30 and the emitter electrode 52 for cooling the emitter electrode 52 by making the use of the cold air flowing in the cold space 30, thereby condensing water from within surrounding air so as to constantly supply the water on the emitter electrode 52.

The atomizing unit 50 includes a high voltage source 74 which applies a high voltage between the emitter electrode 52 and the opposed electrode 54 to atomize the water on the emitter electrode 52 into the charged minute water particles and therefore generate the mist of the particles from the front end of the emitter electrode 52 towards and through the opposed electrode 54, thereby discharging the mist through the outlet port 64 out of the casing 60 into the vegetable room 24. The high voltage source 74 is controlled by a controller 76 to apply the high voltage at a controlled manner for generating and discharging the mist into the vegetable room 24 continuously or at variable intervals. In this connection, the emitter electrode 52 is fitted with a terminal 53 on the bottom of the cavity 92 for electrical connection with the high voltage source 74, while the opposed electrode 54 is provided on its outer periphery with a terminal 55 for electrical connection with the high voltage source 74. The high voltage source 74 and the controller 76 are accommodated within the driver chamber 72 isolated from the mist chamber 70.

Figure 4:
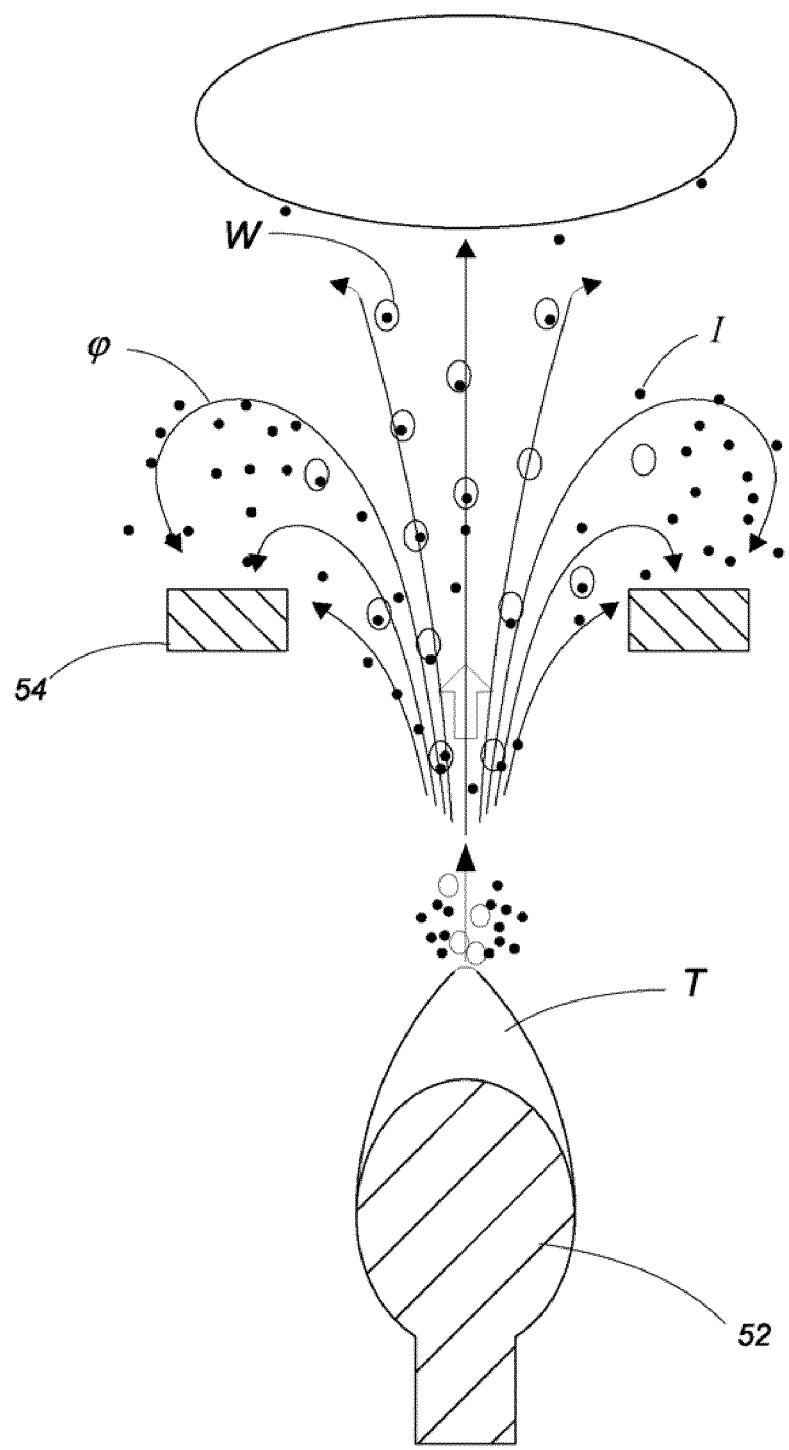
FIG. 4 is a schematic diagram illustrating a mist of charged minute water particles generated by the atomizing unit.

In the present embodiment, the high voltage source 74 is configured to apply 5 kV to the opposed electrode 54 with the emitter electrode 52 being held in a ground potential or 0 V, so as to generate negatively charged minute water particles having a diameter in the order of nanometers at the front end of the emitter electrode 52. In detail, the high voltage difference causes the water at the tip of the emitter electrode 52 to develop a Taylor cone (T), as shown in FIG. 4. As the Taylor cone develops, the electric charge becomes concentrated to a tip of the cone to thereby further increase electric field strength, which causes the cone to grow further with increased concentration of the charge at the tip of the cone. With this consequence, an increased energy is applied to the tip of the cone to cause Rayleigh disintegration to atomize the cone into the charged minute water particles in the order of nanometers.

Although such high voltage difference also causes the emitter electrode 52 to generate negative ions, the negative ions are inherently of extremely less weight than the charged minute water particles, and can be easily seized by the positively charged opposed electrode 54. With this result, as schematically shown in FIG. 4, most of the negative ions (I) moving along electric flux lines (φ) are adhered on the opposed electrode 54, allowing only a minimum number of the negative ions to reach the vegetable room 24 and contents (C) stored therein, thus keeping the vegetable room and the contents from being excessively charged, and therefore minimizing an electrostatic shock experienced by a user. On the other hand, the negatively charged minute water particles (W) are driven to move through the opposed electrode 54 because of its relatively large mass and therefore of large inertia force, thereby reaching and adhering on the wall of the vegetable room 24 as well as the contents (C) stored therein for effective deodorization and sterilization.

Turning back to FIGS. 2 and 3, the atomizing unit 50 is mounted on the partition 44 with its rear wall adhered thereto to communicate the outlet 64 with the interior of the vegetable room 24 for introducing the air of the vegetable room 24 into the mist space 70 as well as discharging the mist into the vegetable room 24. The partition 44 is formed in its surface opposing the vegetable space 24 with a recess 48 which inturn forms a reduced-thickness portion in the partition 44. The rear end of the cooling coupler 90 is fitted in the recess 48 and comes into a heat transfer relation with the cold space 30 through the reduced-thickness portion so as to establish the thermal bridge between the cold space 30 and the emitter electrode 52. The depth of the recess 48 is selected to give an optimum temperature difference between the cooling coupler 90 and the cold space 30 sufficient for cooling the emitter electrode 52 while keeping an intended thermal insulation between the cold space 30 and the vegetable room 24. However, it may be possible to project the rear end of the cooling coupler 90 into the cold space 30 for direct heat transfer relation to the cold air in the cold space 30, where the emitter electrode 52 is not cooled excessively by the cold air, i.e., cooled to a temperature of freezing the water on the emitter electrode 52. The partition 44 is made of a thermally insulating material and is covered with a sheath 45 except at the recess 48.

As shown in FIG. 3, the cooling coupler 90 is shaped to have a larger volume or thermal capacity than the emitter electrode 52 so as to keep cooling the emitter electrode for successive condensation of the water thereon. The water is condensed on a middle portion of the emitter electrode 52 exposed in the cavity 92 of the cooling coupler 90 and on the front end projecting from the cooling coupler 90. The middle portion is confined by the side wall of the cavity 90 in a spaced relation therefrom and can be cooled also from the surrounding wall of the cavity 92. The high voltage source 74 and the controller 76 are isolated away from the cooling coupler 90, and accommodated within the driver chamber 71 separated from the mist chamber 70 so as to be protected from the mist as well as being cooled, and therefore being made moisture-free for reliable electrical operation over a long period of use.

Figure 5:
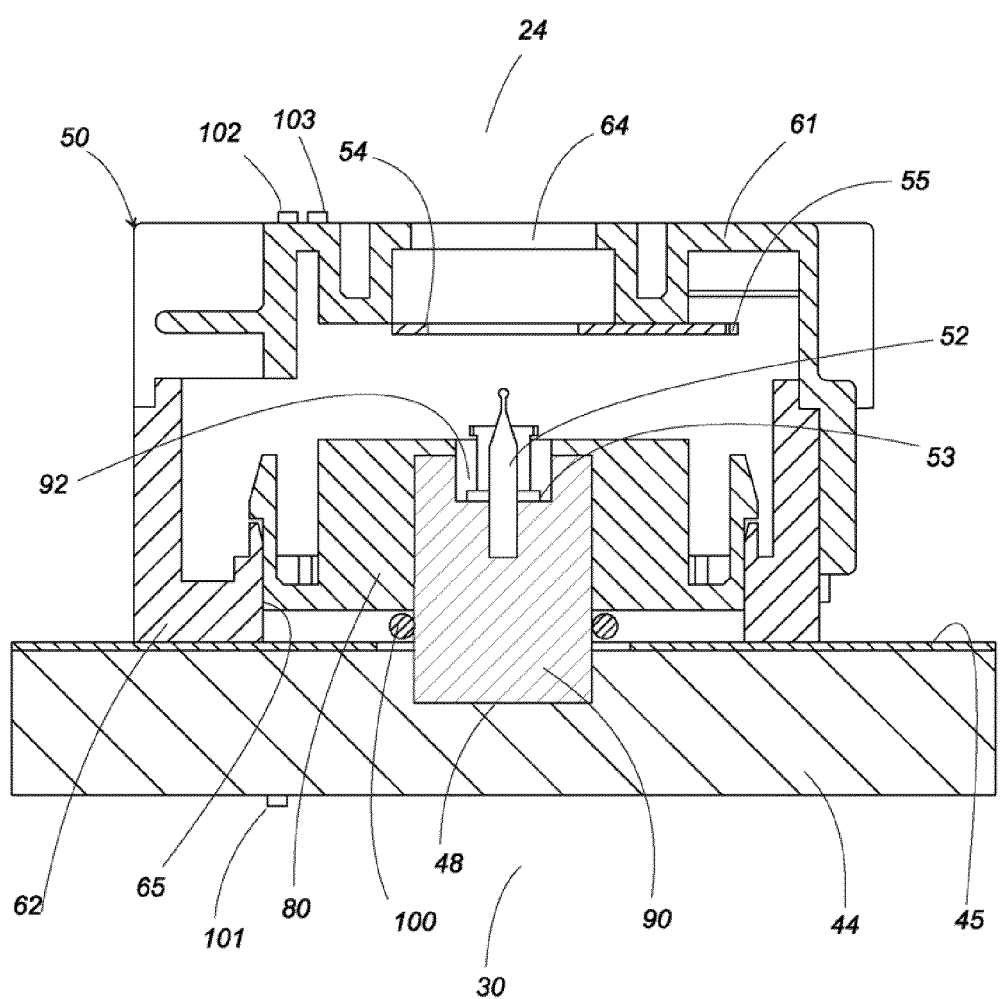
FIG. 5 is a sectional view illustrating a portion of a modified atomizing unit.
Figure 6:
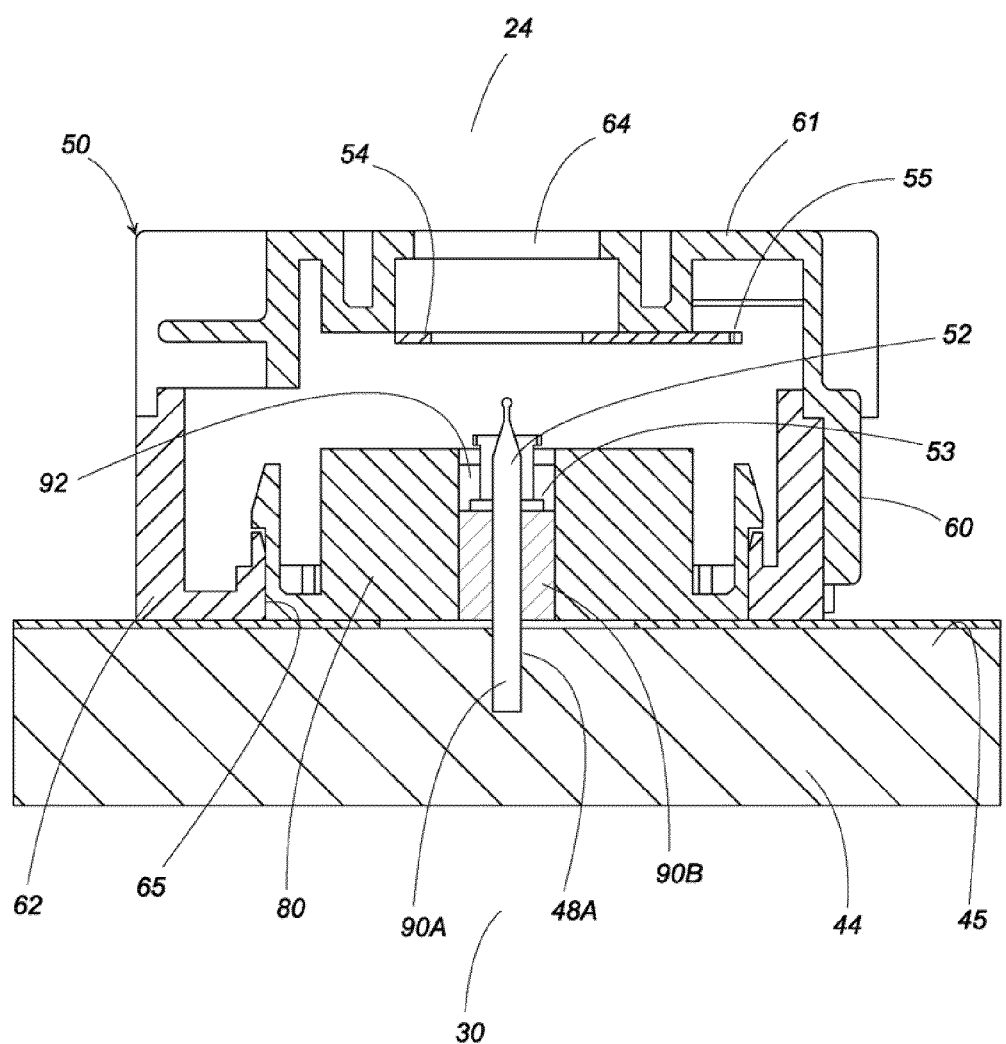
FIG. 6 is a sectional view illustrating a portion of an atomizing unit in accordance with another embodiment of the present invention.

FIG. 5 shows a modification of the atomizing unit which is additionally provided with a heating jacket 100 disposed on the rear end of the frame 80 to surround the cooling coupler 90 between the partition 44 and the frame 80. The other configurations are identical to the above embodiment. Therefore, like parts are designated by like reference numerals, and no duplicate explanation is made herein. The heating jacket 100 is introduced to heat the cooling coupler 90 when the cooling coupler 90 is over-cooled to such an extent of condensing excessive amount of water or freezing the water on the emitter electrode 52. For this purpose, the atomizing unit 50 includes a first temperature sensor 101 provided on the partition 44 for sensing temperature of the cold space 30, a second sensor 102 and a humid sensor 103 respectively provided on the front wall 61 for sensing temperature and humidity of the vegetable room 24. Outputs of these sensors are received at the controller 76 which is configured to determine an optimum temperature to which the emitter electrode 52 is cooled for condensing sufficient amount of water to generate the mist successfully, and to keep the temperature of the cooling coupler 90 around the optimum temperature by activating the heating jacket 100.

During the operation of the refrigerator, it is likely that the temperature and humidity of the vegetable room 24 vary due to frequent door opening and/or varying environment. As a result, there may sometimes occur a considerable temperature difference between the cold space 30 and the vegetable room 24 which would cause excessive cooling of the emitter electrode 52 to condense excessive amount of water or even freeze the water. When this occurs, i.e., the temperature difference exceeds a critical level, the controller 76 responds to activate the heating jacket 100 so as to heat the emitter electrode 52 to the optimum temperature, thereby enabling to keep generating the mist successfully. The optimum temperature and the critical level are constantly updated at the controller 76 in consideration of varying temperatures of the cold space 30 and the vegetable room 24, and also relative humidity of the vegetable room 24.

FIG. 6 shows an atomizing unit 50 in accordance with a second embodiment of the present invention which is identical to the above embodiment except that the emitter electrode 52 is elongated to define at its rear end the cooling coupler 90A. The like parts are designated by like reference numerals, and no duplicate explanation is deemed necessary. The emitter electrode 52 extends through a cooling jacket 90B held within the frame 80 to have its front end project out of the frame 80. The rear end of the emitter electrode 52, i.e., the cooling coupler 90A projects out of the cooling jacket 90B and the bottom wall 62 of the casing 60 into an associated recess 48A in the surface of the partition 44 for establishing a heat transfer relation with the cold space 30 through the reduced-thickness portion of the partition 44. The cooling jacket 90B is made of a heat conductive metallic material into a cylindrical shape surrounding the emitter electrode 52 within the frame 80 or within the casing 60. Thus, the emitter electrode 52 is cooled by the cold air in the cold space to condense the water thereon for generating the mist of the charged minute water particles. In this embodiment, the cooling jacket 90B has a larger volume than the emitter electrode to serves as a thermal accumulator for effectively cooling the emitter electrode 52. The present embodiment may be modified to include the heating jacket 100 and the associated control as mentioned in the above.

In the above embodiments and modification, the high voltage source 74 is preferred to apply the high voltage to the opposed electrode 54 with the emitter electrode 52 being connected to the ground potential or near ground potential in order to keep the housing 20 of the appliance free from the high voltage. However, it may be possible to apply the high voltage to the emitter electrode 52 relative to the opposed electrode 54, for example, +5 kV to the emitter electrode with the opposed electrode being connected to the ground potential, provided that sufficient electrical insulation is made between the emitter electrode and the housing of the appliance. In this instance, the condensed water is atomized into positively charged minute water particles which are discharged in the form of a mist in the vegetable room, i.e., the temperature-regulated space, while at the same time positive discharged from the emitter electrode are entrapped by the opposed electrode of the ground potential to avoid the electrostatic shock, as is discussed with reference to FIG. 4.

The invention claimed is:

1. A temperature-regulating appliance equipped with cooling means and an electrostatically atomizing unit, said appliance being configured to have a temperature-regulated space and a cold space divided by a partition, said temperature-regulated space being configured to have its temperature regulated by an air from said cold space cooled by said cooling means, said atomizing unit comprising:

an emitter electrode being configured to condense thereon water from within the surrounding air when being cooled;

a high voltage source being configured to apply a high voltage to the water on said emitter electrode to electrostatically charge the water for atomizing it into a mist of charged minute water particles;

wherein said emitter electrode is configured to have its front end exposed to said temperature-regulated space and to have its opposite rear end held in heat transfer relation with said cold space through said partition so as to be cooled by said cold space for condensing the water on said emitter electrode, and said atomizing unit comprises a casing configured to accommodate the emitter electrode and the high voltage source, said casing having a front wall and a rear wall spaced from each other, and being mounted at its rear wall on said partition, said front wall being formed with an outlet for introducing the air from said temperature-regulated space and discharging said mist into said temperature-regulated space, and said emitter electrode being provided with a cooling coupler which projects out through said rear wall into said partition, only said cooling coupler projecting into said partition.

2. A temperature-regulating appliance as set forth in claim 1, wherein
said partition is formed partly with a reduced-thickness portion which receives a projecting end of said cooling coupler.

3. A temperature-regulating appliance as set forth in claim 2, wherein
said partition is formed in its surface with a recess which defines said reduced-thickness portion.

4. A temperature-regulating appliance as set forth in claim 1, wherein
said atomizing unit includes an opposed electrode held in an opposite relation with the front end of said emitter electrode,
high voltage source being connected to apply the high voltage across said emitter electrode and said opposed electrode with said emitter electrode being connected to a potential nearer to a ground potential than said opposed electrode.

5. A temperature-regulating appliance as set forth in claim 1, wherein
said emitter electrode is held in heat transfer relation with a heating jacket which is configured to heat said emitter electrode,
said atomizing unit includes a controller which is configured to detect a temperature difference between said cold space and said temperature regulated space and activate said heating jacket only when said temperature difference exceeds a predetermined threshold.

6. A temperature-regulating appliance as set forth in claim 1, wherein said cooling coupler is surrounded by a frame.

7. A temperature-regulating appliance as set forth in claim 1, wherein the rear end of said emitter electrode is embedded into said cooling coupler.

8. A temperature-regulating appliance equipped with cooling means and an electrostatically atomizing unit,
said appliance being configured to have a temperature-regulated space and a cold space divided by a partition, said temperature-regulated space being configured to have its temperature regulated by an air from said cold space cooled by said cooling means,
said atomizing unit comprising:
an emitter electrode being configured to condense thereon water from within the surrounding air when being cooled;
a high voltage source being configured to apply a high voltage to the water on said emitter electrode to electrostatically charge the water for atomizing it into a mist of charged minute water particles;
wherein
said emitter electrode is configured to have its front end exposed to said temperature-regulated space and to have its opposite rear end held in heat transfer relation with said cold space through said partition so as to be cooled by said cold space for condensing the water on said emitter electrode, and
said atomizing unit comprises a casing configured to accommodate the emitter electrode and the high voltage source, said casing having a front wall and a rear wall spaced from each other, and being mounted at its rear wall on said partition, said front wall being formed with an outlet for introducing the air from said temperature-regulated space and discharging said mist into said temperature-regulated space,
said emitter electrode being configured to project its rear end out through said rear wall into said partition.

9. A temperature-regulating appliance as set forth in claim 8, wherein
said emitter electrode is surrounded by a cooling jacket, said cooling jacket having a larger volume than said emitter electrode and being disposed within said casing.

10. A temperature-regulating appliance as set forth in claim 9, wherein said cooling jacket is surrounded by a frame.

11. A temperature-regulating appliance as set forth in claim 8, only said emitter electrode projecting into said partition.

* * * * *